US012731941B2

(12) United States Patent
Chan

(10) Patent No.: US 12,731,941 B2
(45) Date of Patent: Sep. 8, 2026

(54) ELECTRICAL CONNECTOR WITH MULTIPLE SEALS INHIBITING LIQUID INGRESS

(71) Applicant: Cochlear Limited, Macquarie University (AU)

(72) Inventor: Eddie Sze Chuen Chan, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 506 days.

(21) Appl. No.: 18/257,664

(22) PCT Filed: Jan. 3, 2022

(86) PCT No.: PCT/IB2022/050028

§ 371 (c)(1),
(2) Date: Jun. 15, 2023

(87) PCT Pub. No.: WO2022/153136

PCT Pub. Date: Jul. 21, 2022

(65) Prior Publication Data

US 2024/0120682 A1 Apr. 11, 2024

Related U.S. Application Data

(60) Provisional application No. 63/136,371, filed on Jan. 12, 2021.

(51) Int. Cl.

| | |
|---|---|
| ***H01R 13/52*** | (2006.01) |
| ***H01R 43/00*** | (2006.01) |
| *H04R 25/00* | (2006.01) |

(52) U.S. Cl.

CPC ..... *H01R 13/5224* (2013.01); *H01R 13/5219* (2013.01); *H01R 43/005* (2013.01);

(Continued)

(58) Field of Classification Search

CPC ............ H01R 13/5202; H01R 13/5205; H01R 23/5219; H01R 13/5221

(Continued)

(56) References Cited

U.S. PATENT DOCUMENTS

| | | | |
|---|---|---|---|
| 3,601,761 | A | 8/1971 | Harris |
| 4,682,847 | A | 7/1987 | Moore et al. |

(Continued)

FOREIGN PATENT DOCUMENTS

| | | |
|---|---|---|
| CN | 110661135 A | 1/2020 |
| DE | 10 2016 121 635 A1 | 6/2017 |

(Continued)

OTHER PUBLICATIONS

Extended European Search Report issued in European Patent Application No. 22739214.9, dated Nov. 14, 2024 in 10 pages.

(Continued)

*Primary Examiner* — Phuong K Dinh

(74) *Attorney, Agent, or Firm* — Knobbe, Martens, Olson & Bear, LLP

(57) ABSTRACT

An apparatus includes a first element and a second element configured to be repeatedly mechanically coupled to and decoupled from one another, a first seal between the first element and the second element, and a second seal between the first element and the second element. The first seal is configured to inhibit moisture ingress from an environment surrounding the first and second elements to a first region enclosed at least partially by the first seal and the second seal is configured to inhibit moisture ingress from the first region to a second region enclosed at least partially by the second seal. One of the first and second seals includes two first surfaces of the first and second elements in contact with one another, and another one of the first and second seals includes a second surface and a resiliently bendable protru- (Continued)

sion of the first and second elements in contact with one another.

22 Claims, 6 Drawing Sheets

(52) U.S. Cl.
CPC .......... *H01R 2201/12* (2013.01); *H04R 25/60* (2013.01); *H04R 2225/67* (2013.01)

(58) Field of Classification Search
USPC .................................................. 439/271, 282
See application file for complete search history.

(56) References Cited

U.S. PATENT DOCUMENTS

| | | | |
|---|---|---|---|
| 5,104,253 A | | 4/1992 | Zielinski et al. |
| 6,048,229 A | | 4/2000 | Lazaro |
| 6,247,965 B1 | | 6/2001 | Cummings et al. |
| 6,250,946 B1 | | 6/2001 | Tardy |
| 6,558,180 B2 | | 5/2003 | Nishimoto |
| 6,645,011 B2 | | 11/2003 | Schneider et al. |
| 6,655,978 B2 | | 12/2003 | Lutsch et al. |
| 6,736,545 B2 | | 5/2004 | Cairns et al. |
| 6,857,890 B2 | | 2/2005 | Kammerer et al. |
| 6,910,905 B2 | | 6/2005 | Tanaka et al. |
| 7,040,909 B2 | | 5/2006 | Cairns |
| 7,104,831 B2 | | 9/2006 | Fukatsu et al. |
| 7,114,983 B2 | | 10/2006 | Fukatsu et al. |
| 7,195,505 B1 * | | 3/2007 | Becker ............... H01R 13/5219 439/282 |
| 7,351,088 B1 | | 4/2008 | Qu |
| 7,381,078 B2 | | 6/2008 | Mtchedlishvili et al. |
| 7,465,192 B2 | | 12/2008 | Mckenzie et al. |
| 7,553,185 B1 | | 6/2009 | Qu et al. |
| 7,553,186 B2 | | 6/2009 | Morikawa et al. |
| 7,607,927 B2 | | 10/2009 | Kim |
| 7,654,845 B2 | | 2/2010 | Buschle et al. |
| 7,670,164 B2 | | 3/2010 | Shiga |
| 7,695,302 B2 | | 4/2010 | Eissner et al. |
| 7,785,145 B2 | | 8/2010 | Menez |
| 7,946,892 B2 | | 5/2011 | Carboni et al. |
| 7,997,940 B2 | | 8/2011 | Regnier |
| 8,043,105 B2 | | 10/2011 | Schmidt et al. |
| 8,087,954 B2 | | 1/2012 | Fuchs |
| 8,167,635 B1 | | 5/2012 | Mathews |
| 8,288,651 B2 | | 10/2012 | Smith |
| 8,462,971 B2 | | 6/2013 | Gommel et al. |
| 8,647,150 B2 | | 2/2014 | Fujiwara et al. |
| 9,148,943 B2 | | 9/2015 | Beliveau et al. |
| 9,482,255 B2 | | 11/2016 | Changsrivong et al. |
| 9,638,380 B2 | | 5/2017 | Kramer et al. |
| 9,711,915 B2 | | 7/2017 | Hiramatsu et al. |
| 9,887,486 B2 | | 2/2018 | Okamoto |
| 9,941,636 B2 | | 4/2018 | Jodon et al. |
| 10,074,924 B2 | | 9/2018 | Yamanaka |
| 10,128,607 B2 | | 11/2018 | Lane et al. |
| 10,141,688 B2 | | 11/2018 | Wimmer et al. |
| 10,211,568 B2 | | 2/2019 | Blakborn et al. |
| 10,361,512 B2 | | 7/2019 | Seido |
| 10,395,082 B1 | | 8/2019 | Thompson et al. |
| 10,476,203 B2 | | 11/2019 | Oishi et al. |
| 10,498,072 B2 | | 12/2019 | Hashimoto et al. |
| 10,601,168 B2 | | 3/2020 | Onodi et al. |
| 10,608,386 B2 | | 3/2020 | Lehnert et al. |
| 10,637,188 B2 | | 4/2020 | Schmidt |
| 10,737,007 B2 | | 8/2020 | Duhamel et al. |
| 10,804,639 B2 | | 10/2020 | Masuda et al. |
| 2007/0026695 A1 | | 2/2007 | Lee et al. |
| 2007/0224881 A1 | | 9/2007 | Fujiwara et al. |
| 2008/0139030 A1 | | 6/2008 | Milo |
| 2009/0215296 A1 | | 8/2009 | Chambers |
| 2015/0255912 A1 | | 9/2015 | Natter et al. |
| 2017/0069997 A1 | | 3/2017 | Markefka |
| 2017/0250495 A1 | | 8/2017 | Yudate |
| 2019/0348793 A1 | | 11/2019 | Boe |

FOREIGN PATENT DOCUMENTS

| | | |
|---|---|---|
| EP | 2713448 B1 | 3/2016 |
| JP | 2017-004664 A | 1/2017 |
| KR | 10-2018-0017692 A | 2/2018 |

OTHER PUBLICATIONS

Written Opinion and International Search Report of International Application No. PCT/IB2022/050028 dated May 3, 2022 in 11 pages.

* cited by examiner

ELECTRICAL CONNECTOR WITH MULTIPLE SEALS INHIBITING LIQUID INGRESS

BACKGROUND

Field

The present application relates generally to systems and methods for facilitating wired power and data transmission, and more specifically, for facilitating wired power and data transmission using two connector portions configured to be repeatedly mechanically coupled to and decoupled from one another.

Description of the Related Art

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In one aspect disclosed herein, an apparatus comprises a first element and a second element configured to be repeatedly mechanically coupled to and decoupled from one another. The apparatus further comprises a first seal between the first element and the second element. The first seal is configured to inhibit moisture ingress from an environment surrounding the first and second elements to a first region enclosed at least partially by the first seal. The apparatus further comprises a second seal between the first element and the second element. The second seal is configured to inhibit moisture ingress from the first region to a second region enclosed at least partially by the second seal. One of the first and second seals comprises two first surfaces of the first and second elements in contact with one another, and another one of the first and second seals comprises a second surface and a resiliently bendable protrusion of the first and second elements in contact with one another.

In another aspect disclosed herein, an apparatus comprises an elastic protrusion, a surface facing the elastic protrusion, and a first region between the elastic protrusion and the surface. The first region is configured to receive a pair of oppositely facing sealing surfaces such that the surface engages one of the sealing surfaces to form a first moisture seal and the elastic protrusion engages and is bent by another of the sealing surfaces to form a second moisture seal.

In another aspect disclosed herein, a method comprises providing a first mating portion comprising a first plurality of electrical conduits and a second mating portion comprising a second plurality of electrical conduits configured to engage and be in electrical communication with the first plurality of electrical conduits. The method further comprises pressing a first surface of the first mating portion against a second surface of the second mating portion such that he first and second surfaces form a first moisture barrier between the first and second mating portions. The method further comprises pressing and bending an elastic protrusion of the second mating portion using a third surface of the first mating portion such that the elastic protrusion and the third surface form a second moisture barrier between the first and second mating portions.

BRIEF DESCRIPTION OF THE DRAWINGS

Implementations are described herein in conjunction with the accompanying drawings, in which.

DETAILED DESCRIPTION

Figure 1:
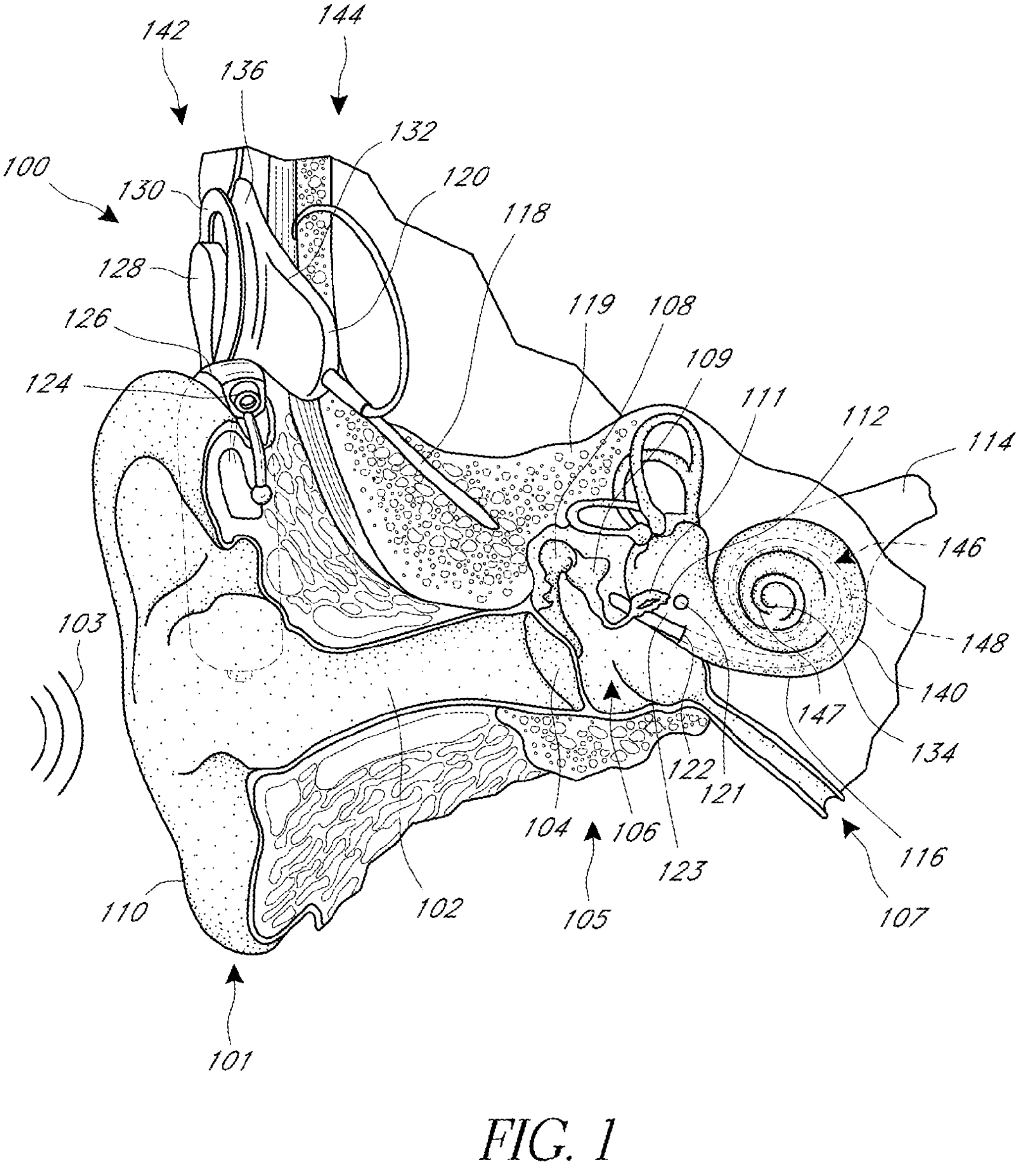
FIG. 1 is a perspective view of an example cochlear implant auditory prosthesis implanted in a recipient in accordance with certain implementations described herein.

Certain implementations described herein provide small electrical multi-pin plug-and-socket connectors (e.g., for use in wearable devices or medical devices) that provide enhanced inhibition to moisture ingress from a surrounding environment into an enclosed region without compromising component size, electrical conductivity, and/or sealing. The plug and the socket have a first seal that inhibits moisture ingress into a first region from the environment and a second seal that inhibits moisture ingress into a second region from the first region. For example, one of the two seals can include a snap seal formed by surfaces of the plug and the socket in contact with one another and the other of the two seals can include a lip seal formed by a rigid surface and a resiliently bendable protrusion in contact with one another.

The teachings detailed herein are applicable, in at least some implementations, to any type of system or device (e.g., medical device configured to be worn by a recipient) having two electrical connector portions expected to be repeatedly mechanically coupled to and decoupled from one another and to withstand moisture ingress into a region bounded at least partially by the two portions. For example, the system can be an implantable medical device (e.g., implantable sensory prostheses; auditory prosthesis system) comprising an external first sub-system (e.g., sound processor external to a recipient) and an internal second sub-system (e.g., actuator and/or stimulator implanted on or within the recipient and configured to generate stimulation signals that are perceived by the recipient as sounds). The first sub-system can comprise two electrical connector portions (e.g., a first electrical connector portion that is a component of the external sound processor and a second electrical connector portion that is a component of an electrical cable in operative communication with an external communication unit (e.g., communication coil) configured to wirelessly (e.g., transcutaneously) transmit power and/or data (e.g., control signals) to the second sub-system and to wirelessly (e.g., transcutaneously) communicate with the second sub-system. Examples of auditory prosthesis systems compatible with certain implementations described herein include but are not limited to: electro-acoustic electrical/acoustic systems, cochlear implant devices, implantable hearing aid devices, middle ear implant devices, Direct Acoustic Cochlear Implant (DACI), middle ear transducer (MET), electro-acoustic implant devices, other types of auditory prosthesis devices, and/or combinations or variations thereof, or any other suitable hearing prosthesis system with or without one or more external components Implementations can include any type of medical device that can utilize the teachings detailed herein and/or variations thereof.

Merely for ease of description, apparatus and methods disclosed herein are primarily described with reference to an illustrative medical device, namely a cochlear implant. However, the teachings detailed herein and/or variations thereof may also be used with a variety of other wearable components/devices (e.g., medical devices) that provide a wide range of therapeutic benefits to recipients, patients, or other users. In some implementations, the teachings detailed herein and/or variations thereof can be utilized in other types of implantable medical devices beyond auditory prostheses. For example, apparatus and methods disclosed herein and/or variations thereof may also be used with one or more of the following: vestibular devices (e.g., vestibular implants); visual devices (e.g., bionic eyes); visual prostheses (e.g., retinal implants); sensors; cardiac pacemakers; drug delivery systems; defibrillators; functional electrical stimulation devices; catheters; brain implants; seizure devices (e.g., devices for monitoring and/or treating epileptic events); sleep apnea devices; electroporation; etc. The concepts described herein and/or variations thereof can be applied to any of a variety of implantable medical devices comprising an implanted component configured to use magnetic induction to communicate transcutaneously with an external component (e.g., receive control signals from the external component and/or transmit sensor signals to the external component) while using magnetic induction to receive power from the external component. In still other implementations, the teachings detailed herein and/or variations thereof can be utilized in other types of systems beyond components/devices (e.g., medical devices) utilizing magnetic induction for both wireless power transfer and data communication. For example, such other components, devices, and/or systems can include one or more of the following: wearable devices (e.g., smartwatches), consumer products (e.g., smartphones; IoT devices), and electric vehicles (e.g., automobiles).

FIG. 1 is a perspective view of an example cochlear implant auditory prosthesis 100 implanted in a recipient in accordance with certain implementations described herein. The example auditory prosthesis 100 is shown in FIG. 1 as comprising an implanted stimulator unit 120 (e.g., an actuator) and an external microphone assembly 124 (e.g., a partially implantable cochlear implant). An example auditory prosthesis 100 (e.g., a totally implantable cochlear implant) in accordance with certain implementations described herein can replace the external microphone assembly 124 shown in FIG. 1 with a subcutaneously implantable assembly comprising an acoustic transducer (e.g., microphone), as described more fully herein.

As shown in FIG. 1, the recipient normally has an outer ear 101, a middle ear 105, and an inner ear 107. In a fully functional ear, the outer ear 101 comprises an auricle 110 and an ear canal 102. An acoustic pressure or sound wave 103 is collected by the auricle 110 and is channeled into and through the ear canal 102. Disposed across the distal end of the ear canal 102 is a tympanic membrane 104 which vibrates in response to the sound wave 103. This vibration is coupled to oval window or fenestra ovalis 112 through three bones of middle ear 105, collectively referred to as the ossicles 106 and comprising the malleus 108, the incus 109, and the stapes 111. The bones 108, 109, and 111 of the middle ear 105 serve to filter and amplify the sound wave 103, causing the oval window 112 to articulate, or vibrate in response to vibration of the tympanic membrane 104. This vibration sets up waves of fluid motion of the perilymph within the cochlea 140. Such fluid motion, in turn, activates tiny hair cells (not shown) inside the cochlea 140. Activation of the hair cells causes appropriate nerve impulses to be generated and transferred through the spiral ganglion cells (not shown) and auditory nerve 114 to the brain (also not shown) where they are perceived as sound.

As shown in FIG. 1, the example auditory prosthesis 100 comprises one or more components which are temporarily or permanently implanted in the recipient. The example auditory prosthesis 100 is shown in FIG. 1 with an external component 142 which is directly or indirectly attached to the recipient's body, and an internal component 144 which is temporarily or permanently implanted in the recipient (e.g., positioned in a recess of the temporal bone adjacent auricle 110 of the recipient). The external component 142 typically comprises one or more input elements/devices for receiving input signals at a sound processing unit 126. The one or more input elements/devices can include one or more sound input elements (e.g., one or more external microphones 124) for detecting sound and/or one or more auxiliary input devices (not shown in FIG. 1)(e.g., audio ports, such as a Direct Audio Input (DAI); data ports, such as a Universal Serial Bus (USB) port; cable ports, etc.). In the example of FIG. 1, the sound processing unit 126 is a behind-the-ear (BTE) sound processing unit configured to be attached to, and worn adjacent to, the recipient's ear. However, in certain other implementations, the sound processing unit 126 has other arrangements, such as by an OTE processing unit (e.g., a component having a generally cylindrical shape and which is configured to be magnetically coupled to the recipient's head), a mini or micro-BTE unit, an in-the-canal unit that is configured to be located in the recipient's ear canal, a body-worn sound processing unit, etc.

The sound processing unit 126 of certain implementations includes a power source (not shown in FIG. 1)(e.g., battery), a processing module (not shown in FIG. 1)(e.g., comprising one or more digital signal processors (DSPs), one or more microcontroller cores, one or more application-specific integrated circuits (ASICs), firmware, software, etc. arranged to perform signal processing operations), and an external transmitter unit 128. In the illustrative implementation of FIG. 1, the external transmitter unit 128 comprises circuitry that includes at least one external inductive communication coil 130 (e.g., a wire antenna coil comprising multiple turns of electrically insulated single-strand or multi-strand platinum or gold wire). The external transmitter unit 128 also generally comprises a magnet (not shown in FIG. 1) secured directly or indirectly to the at least one external inductive communication coil 130. The at least one external inductive communication coil 130 of the external transmitter unit 128 is part of an inductive radio frequency (RF) communication link with the internal component 144. The sound processing unit 126 processes the signals from the input elements/devices (e.g., microphone 124 that is positioned externally to the recipient's body, in the depicted implementation of FIG. 1, by the recipient's auricle 110). The sound processing unit 126 generates encoded signals, sometimes referred to herein as encoded data signals, which are provided to the external transmitter unit 128 (e.g., via a cable). As will be appreciated, the sound processing unit 126 can utilize digital processing techniques to provide frequency shaping, amplification, compression, and other signal conditioning, including conditioning based on recipient-specific fitting parameters.

The power source of the external component 142 is configured to provide power to the auditory prosthesis 100, where the auditory prosthesis 100 includes a battery (e.g., located in the internal component 144, or disposed in a separate implanted location) that is recharged by the power provided from the external component 142 (e.g., via a transcutaneous energy transfer link). The transcutaneous energy transfer link is used to transfer power and/or data to the internal component 144 of the auditory prosthesis 100. Various types of energy transfer, such as infrared (IR), electromagnetic, capacitive, and inductive transfer, may be used to transfer the power and/or data from the external component 142 to the internal component 144. During operation of the auditory prosthesis 100, the power stored by the rechargeable battery is distributed to the various other implanted components as needed.

The internal component 144 comprises an internal receiver unit 132, a stimulator unit 120, and an elongate stimulation assembly 118. In some implementations, the internal receiver unit 132 and the stimulator unit 120 are hermetically sealed within a biocompatible housing, sometimes collectively referred to as a stimulator/receiver unit. The internal receiver unit 132 comprises at least one internal inductive communication coil 136 (e.g., a wire antenna coil comprising multiple turns of electrically insulated single-strand or multi-strand platinum or gold wire), and generally, a magnet (not shown in FIG. 1) fixed relative to the at least one internal inductive communication coil 136. The at least one internal inductive communication coil 136 receives power and/or data signals from the at least one external inductive communication coil 130 via a transcutaneous energy transfer link (e.g., an inductive RF link). The stimulator unit 120 generates stimulation signals (e.g., electrical stimulation signals; optical stimulation signals) based on the data signals, and the stimulation signals are delivered to the recipient via the elongate stimulation assembly 118.

The elongate stimulation assembly 118 has a proximal end connected to the stimulator unit 120, and a distal end implanted in the cochlea 140. The stimulation assembly 118 extends from the stimulator unit 120 to the cochlea 140 through the mastoid bone 119. In some embodiments, the stimulation assembly 118 can be implanted at least in the basal region 116, and sometimes further. For example, the stimulation assembly 118 can extend towards an apical end of the cochlea 140, referred to as the cochlea apex 134. In certain circumstances, the stimulation assembly 118 can be inserted into the cochlea 140 via a cochleostomy 122. In other circumstances, a cochleostomy can be formed through the round window 121, the oval window 112, the promontory 123, or through an apical turn 147 of the cochlea 140.

The elongate stimulation assembly 118 comprises a longitudinally aligned and distally extending array 146 (e.g., electrode array; contact array) of stimulation elements 148 (e.g., electrical electrodes; electrical contacts; optical emitters; optical contacts). The stimulation elements 148 are longitudinally spaced from one another along a length of the elongate body of the stimulation assembly 118. For example, the stimulation assembly 118 can comprise an array 146 comprising twenty-two (22) stimulation elements 148 that are configured to deliver stimulation to the cochlea 140. Although the array 146 of stimulation elements 148 can be disposed on the stimulation assembly 118, in most practical applications, the array 146 is integrated into the stimulation assembly 118 (e.g., the stimulation elements 148 of the array 146 are disposed in the stimulation assembly 118). As noted, the stimulator unit 120 generates stimulation signals (e.g., electrical signals; optical signals) which are applied by the stimulation elements 148 to the cochlea 140, thereby stimulating the auditory nerve 114.

While FIG. 1 schematically illustrates an auditory prosthesis 100 utilizing an external component 142 comprising an external microphone 124, an external sound processing unit 126, and an external power source, in certain other implementations, one or more of the microphone 124, sound processing unit 126, and power source are implantable on or within the recipient (e.g., within the internal component 144). For example, the auditory prosthesis 100 can have each of the microphone 124, sound processing unit 126, and power source implantable on or within the recipient (e.g., encapsulated within a biocompatible assembly located subcutaneously), and can be referred to as a totally implantable cochlear implant ("TICI"). For another example, the auditory prosthesis 100 can have most components of the cochlear implant (e.g., excluding the microphone, which can be an in-the-ear-canal microphone) implantable on or within the recipient, and can be referred to as a mostly implantable cochlear implant ("MICI").

In accordance with certain implementations described herein, the apparatus 200 comprises a first element 210 and a second element 220 configured to be repeatedly mechanically coupled to and decoupled from one another. The apparatus 200 further comprises a first seal 230 between the first element 210 and the second element 220. The first seal 230 (e.g., moisture seal) is configured to inhibit moisture ingress from an environment 240 surrounding the first and second elements 210, 220 to a first region 250 enclosed at least partially by the first seal 230. The apparatus 200 further comprises a second seal 260 between the first element 210 and the second element 220. The second seal 260 (e.g., moisture seal) is configured to inhibit moisture ingress from the first region 250 to a second region 270 enclosed at least partially by the second seal 260. One of the first and second seals 230, 260 comprises two first surfaces 212, 222 of the first and second elements 210, 220 in contact with one another. Another one of the first and second seals 230, 260 comprises a second surface 214 and a resiliently bendable protrusion 224 of the first and second elements 210, 220 in contact with one another.

Figure 2A:
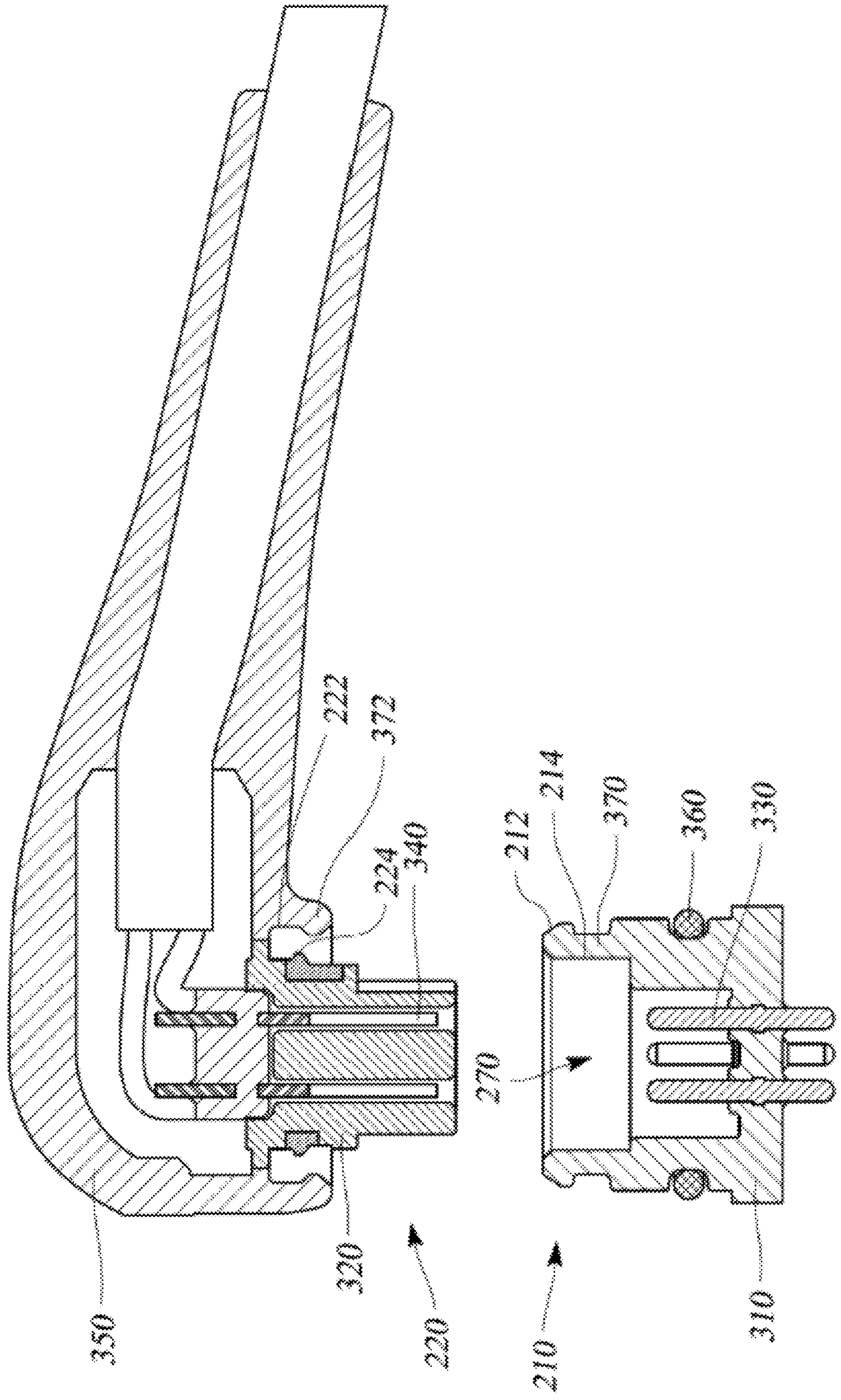
FIGS. 2A-2B schematically illustrate substantially cross-sectional views of an example apparatus with the first element and the second element mechanically decoupled from one another and mechanically coupled to one another, respectively, in accordance with certain implementations described herein.
Figure 2B:
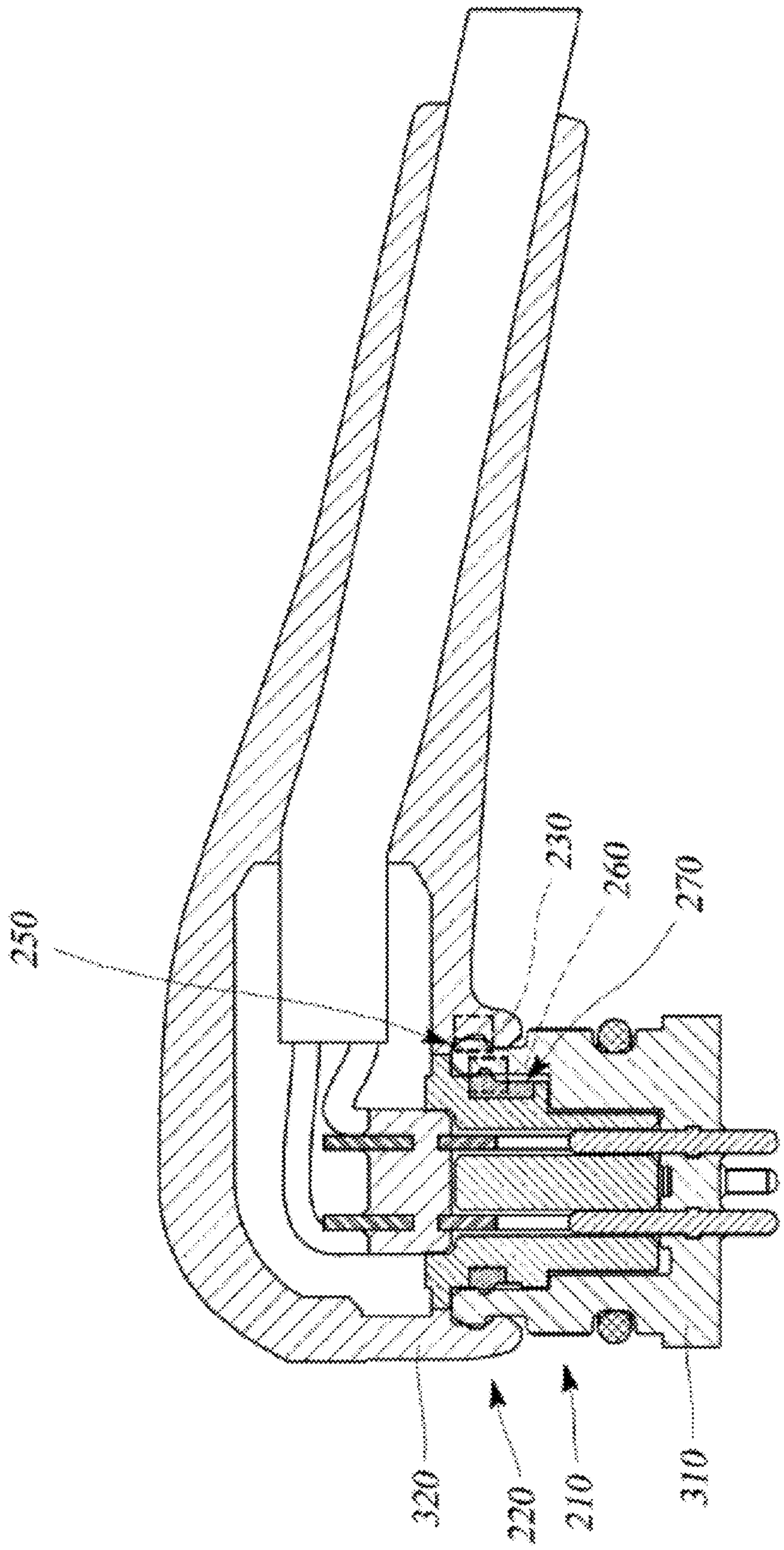

FIGS. 2A and 2B schematically illustrate substantially cross-sectional views of an example apparatus 200 with the first element 210 and the second element 220 mechanically decoupled from one another and mechanically coupled to one another, respectively, in accordance with certain implementations described herein. In certain implementations, the first element 210 comprises a socket 310 and the second element 220 comprises a plug 320 (see, e.g., FIGS. 2A-2B), while in certain other implementations, the first element 210 comprises a plug 320 and the second element 220 comprises a socket 310.

In certain implementations, the socket 310 comprises a first set of electrical connectors 330 (e.g., electrically conductive protrusions, pins, receptacles, recesses, and/or forks) and the plug 320 comprises a second set of electrical connectors 340 (e.g., electrically conductive protrusions, pins, receptacles, recesses, and/or forks) configured to be in mechanical and electrical communication with (e.g., to mate with) the first set of electrical connectors 330. Both the first set of electrical connectors 330 and the second set of electrical connectors 340 are at least partially within (e.g., extend into) the second region 270 and are in electrical communication with respective electrical conduits (e.g., bonded, soldered, or welded to wires) in electrical communication with respective circuitry. Upon the socket 310 and the plug 320 being coupled to one another, the electrical connectors 330 of the socket 310 are in mechanical and electrical communication with the electrical connectors 340 of the plug 320 such that the respective circuitry are in electrical communication with one another.

In certain implementations, the plug 320 is a portion of an electrical cable assembly 350 and the socket 310 is configured to be mounted on or within a component (e.g., sound processing unit 126) comprising circuitry that is in electrical communication with the electrical connectors 330. In certain such implementations, the socket 310 is mounted with a moisture-resistant seal between the socket 310 and the surrounding component (e.g., a seal formed by compression of an O-ring 360 between surfaces of the socket 310 and the component).

In certain implementations, the first seal 230 comprises a snap seal comprising the two first surfaces 212, 222 of the first and second elements 210, 220 in contact with one another. For example, the first element (e.g., socket 310) can comprise one first surface 212, the second element 220 (e.g., plug 320) can comprise the other first surface 222, and the first element 210 and the second element 220 can be configured to snap together and the two first surfaces 212, 222 can be configured to contact and press against one another upon the first and second elements 210, 220 being snapped together (see, e.g., FIG. 2B). The first element 210 of certain such implementations can comprise an elongate portion 370 (e.g., protrusion) comprising a thermoplastic material (e.g., polyetherimide or PEI) with the first surface 212 comprising an outer surface (e.g., a surface facing away from the second region 270) of the elongate portion 370 (see, e.g., FIG. 2A). The second element 220 of certain such implementations can comprise an outer molding 372 comprising a thermoplastic elastomer or silicone material with the first surface 222 comprising an inner surface (e.g., a surface facing towards the second region 270) of the outer molding 372 (see, e.g., FIG. 2A), and the elongate portion 370 can be configured to snap into the outer molding 372. In certain implementations, the first surface 222 comprises a thermoplastic elastomer or silicone material configured to be sufficiently soft (e.g., a Shore A hardness in a range of 60 to 75) such that the first surface 212 (e.g., comprising a plastic material sufficiently harder than the material of the first surface 222) indents the thermoplastic elastomer or silicone material of the first surface 222, thereby forming the first seal 230. Examples of thermoplastic elastomer materials compatible with certain implementations described herein include, but are not limited to, polyether block amide (e.g., TPA), copolyester (e.g., TPC), thermoplastic polyurethane (e.g., TPU), polyoefine elastomers (e.g., TPO), crosslinked thermoplastic elastomers (e.g., TPV), and styrenic block copolymers (e.g., TPS). Other configurations of the first surfaces 212, 222 are also compatible with certain implementations described herein (e.g., having the first surface 212 comprising a sufficiently soft material such that the first surface 222 indents the material of the first surface 212).

In certain implementations, the second seal 260 comprises a lip seal comprising the second surface 214 and the resiliently bendable protrusion 224 of the first and second elements 210, 220 in contact with one another. For example, the first element 210 (e.g., socket 310) can comprise the second surface 214 and the second element 220 (e.g., plug 320) can comprise the resiliently bendable protrusion 224, while in another example, the first element 210 can comprise the resiliently bendable protrusion 224 and the second element 220 can comprise the second surface 214. The first element 210 of certain such implementations can comprise a portion (e.g., elongate portion 370) comprising a thermoplastic material (e.g., polyetherimide or PEI) with the second surface 214 comprising an inner surface (e.g., a surface facing towards the second region 270) of the portion (see, e.g., FIG. 2A). The resiliently bendable protrusion 224 of certain such implementations can extend in an outward direction (e.g., a direction away from the second region 270) and can comprise an inset portion of the plug 320 that comprises a thermoplastic elastomer material (e.g., Hytrel® available from DuPont de Nemours, Inc.) configured to be bent by the second surface 214 upon the second element 220 being mechanically coupled to the first element 210 (e.g., the first and second elements 210, 220 being snapped together). The lip seal formed by the second surface 214 and the resiliently bendable protrusion 224 is formed by the bending of the protrusion 224 against the second surface 214, which is different from other types of moisture seals that rely on compression of an elastomer element between at least two substantially rigid surfaces (e.g., O-ring seals). Other configurations of the second surface 214 and the resiliently bendable protrusion 224 are also compatible with certain implementations described herein.

FIGS. 2A-2B show an example apparatus 200 in which the first surface 222 faces the protrusion 224 with a region therebetween, the region configured to receive the oppositely facing first and second surfaces 212, 214 of the elongate portion 370 such that the first surface 222 engages the first surface 212 to form the first seal 230 and the protrusion 224 engaging and bent by the second surface 214 to form the second seal 260. Upon the first and second elements 210, 220 being coupled to one another (e.g., the region between the protrusion 224 and the first surface 222 receiving the first and second surfaces 212, 214), the first seal 230 is configured to inhibit moisture ingress into the first region 250 (e.g., a portion of the region between the protrusion 224 and the first surface 222) from the surrounding environment 240 and the second seal 260 is configured to inhibit moisture ingress into the second region 270 from the first region 250. While FIGS. 2A-2B schematically illustrate the snap seal (e.g., first seal 230) between the environment and the first region 250 and the lip seal (e.g., second seal 260) between the first region 250 and the second region 270, in certain other implementations, the lip seal is between the environment and the first region 250 and the snap seal is between the first region 250 and the second region 270.

In certain implementations, the protrusion 224 and the first surface 222 are substantially circular and concentric with one another (e.g., in a plane perpendicular to the cross-sectional plane of FIGS. 2A-2B), the first and second surfaces 212, 214 are substantially circular and concentric with one another (e.g., in a plane perpendicular to the cross-sectional plane of FIGS. 2A-2B), and the first seal 230 and the second seal 260 are each substantially circular (e.g., in a plane perpendicular to the cross-sectional plane of FIGS. 2A-2B). For example, as schematically illustrated in FIGS. 2A-2B, the first surface 222 of the second element 220 can comprise a beveled surface at least partially bounding a recess configured to form a snap fit with the elongate portion 370 of the first element 210, an end of the elongate portion 370 comprising a substantially D-shaped cross-section in the cross-sectional plane of FIGS. 2A-2B (e.g., in a plane substantially perpendicular to the first and second seals 230, 260). Other shapes of the protrusion 224, first surfaces 212, 222, and second surface 214 (e.g., oval; geometric; non-geometric) are also compatible with certain implementations described herein.

In certain implementations, a force applied by the first surface 222 (e.g., the inner surface of the outer molding 372) against the first surface 212 presses the elongate portion 370 against the resiliently bendable protrusion 224. Certain such implementations in which the first and second seals 230, 260 share a common component (e.g., elongate portion 370) and the forces applied to the common component by the first surface 222 and the protrusion 224 pressing against the common component are in substantially opposite and substantially colinear directions can advantageously improve the sealing by one or both of the first seal 230 and the second seal 260 compared to configurations in which the first and second seals 230, 260 do not share a common component of the first and second elements 210, 220 and/or the forces applied to the common component are not in substantially opposite and substantially colinear directions. In certain implementations, the first and second seals 230, 260 are configured to prevent moisture from reaching the second region 270 even when exposed to high moisture environments (e.g., submerged in water at a depth of one meter for a period of one hour).

Figure 3:
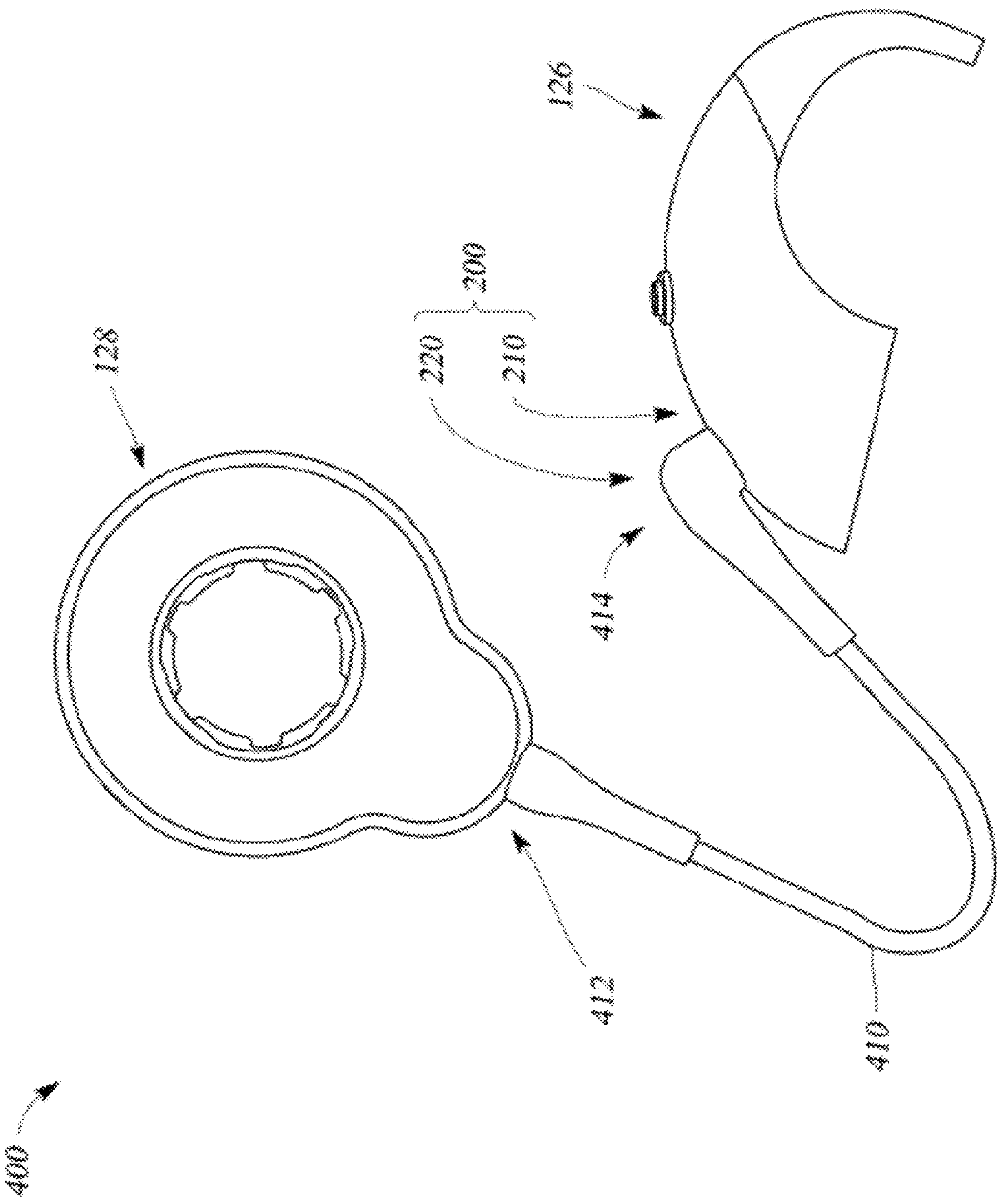
FIG. 3 schematically illustrates an example system comprising an example apparatus in accordance with certain implementations described herein.

In certain implementations, the apparatus 200 is an external portion of a medical system (e.g., a portion that is not implanted on or within the recipient). For example, FIG. 3 schematically illustrates an example external portion 400 of an acoustic prosthesis system 100 (e.g., a cochlear implant system) comprising an example apparatus 200 in accordance with certain implementations described herein. The portion 400 can comprise a sound processing unit 126 comprising first circuitry (e.g., a power source and/or a processing module) configured to perform signal processing operations. The portion 400 can further comprise an external transmitter unit 128 comprising second circuitry (e.g., at least one external inductive communication coil 130) that is part of an inductive RF communication link with an internal component 144 of the acoustic prosthesis system 100. The external portion 400 of FIG. 3 further comprises an electrical cable 410 (e.g., comprising a plurality of electrically conductive wires) configured to be in electrical communication with the external transmitter unit 128 (e.g., via an electrical connector 412) and in electrical communication with the sound processing unit 126 (e.g., via an electrical connector 414). In certain implementations, one or both of the electrical connectors 412, 414 comprises an apparatus 200 as described herein. In certain implementations (as shown in FIG. 3), a component comprising active circuitry (e.g., the sound processing unit 126) comprises the first element 210 of the apparatus 200 and the electrical cable 410 comprises the second element 220 of the apparatus 200, while in certain other implementations, the electrical cable 410 comprises the first element 210 of the apparatus 200 and the component comprising active circuitry comprises the second element 220 of the apparatus 200.

Figure 4A:
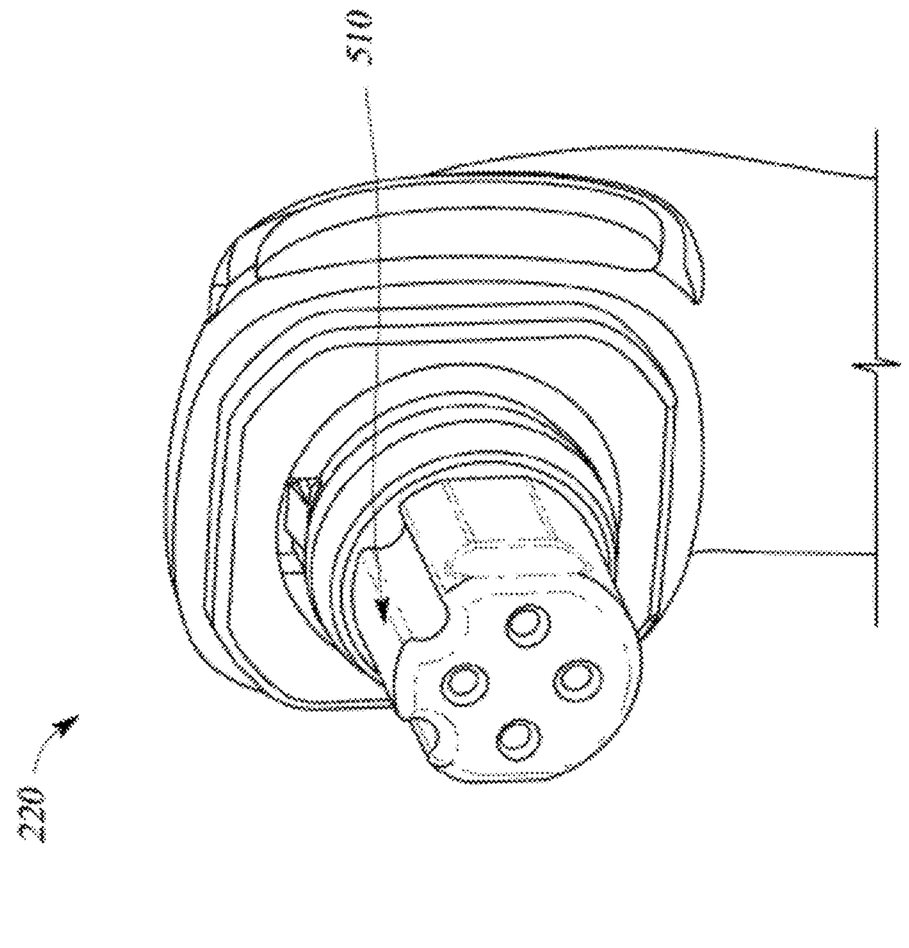
FIGS. 4A-4B schematically illustrate two example second portions having at least one rotation inhibiting structure in accordance with certain implementations described herein.
Figure 4B:
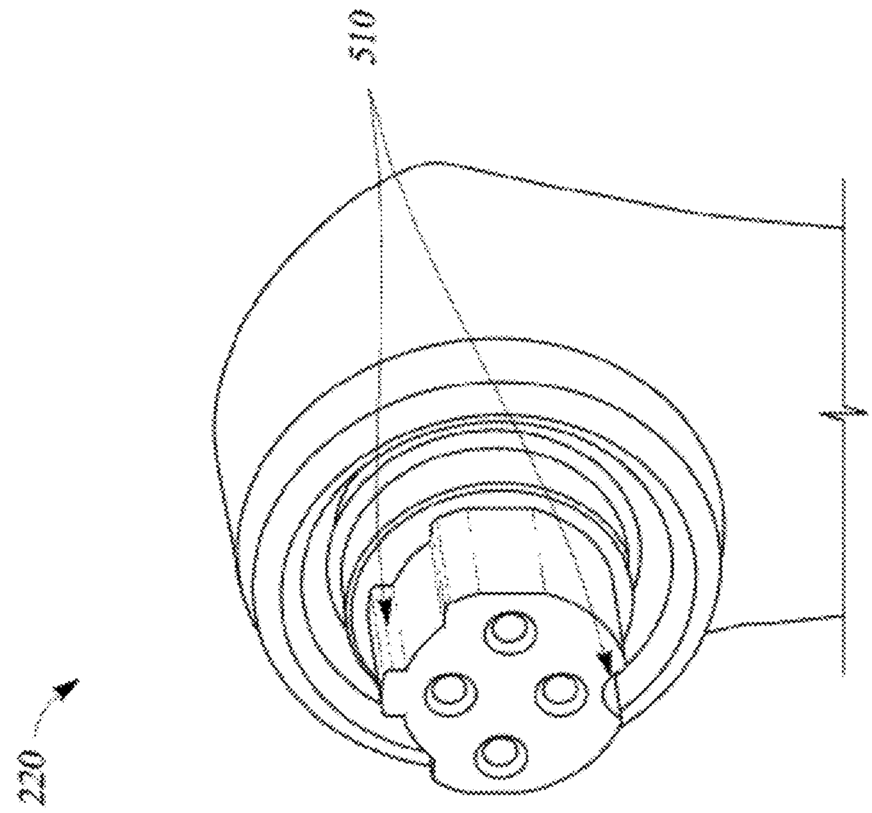

FIGS. 4A and 4B schematically illustrate two example second elements 220 having at least one rotation inhibiting structure 510 in accordance with certain implementations described herein. For example, the first element 210 can comprise at least one first interlock portion (e.g., at least one socket portion having one or more recesses and/or protrusions) and the second element 220 comprises at least one second interlock portion (e.g., at least one plug portion having one or more protrusions and/or recesses) configured to couple (e.g., mate; engage) with and to decouple (e.g., disengage) from the at least one first interlock portion. The at least one first interlock portion and the at least one second interlock portion can be configured to ensure electrical pin alignment and/or to inhibit the relative rotation between the first element 210 and the second element 220 about a center axis such that the at least one rotation inhibiting structure 510 provides protection against externally-applied relative torques between the first element 210 and the second element 220.

Figure 5:
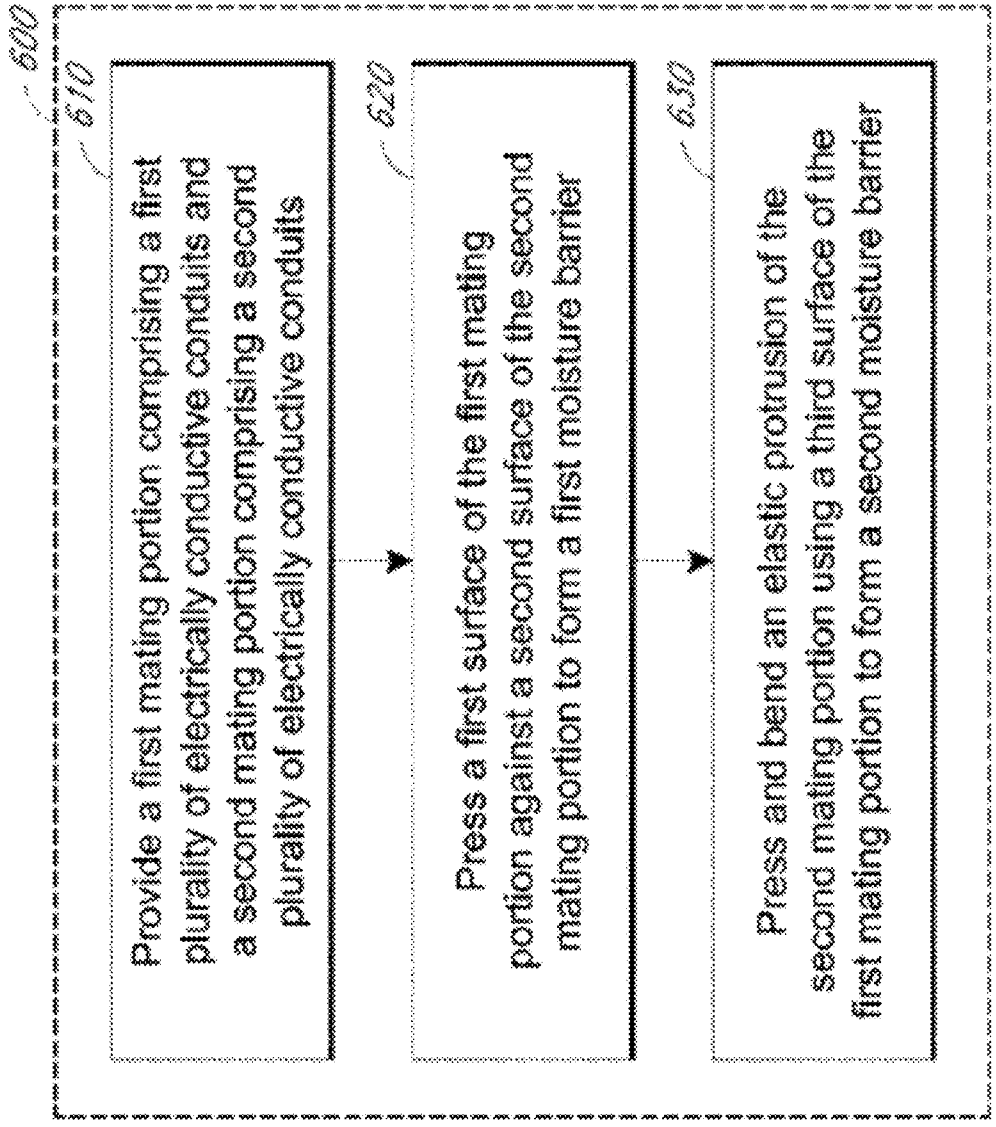
FIG. 5 is a flow diagram of an example method in accordance with certain implementations described herein.

FIG. 5 is a flow diagram of an example method 600 in accordance with certain implementations described herein. In an operational block 610, the method 600 comprises providing a first mating portion (e.g., first element 210) comprising a first plurality of electrically conductive conduits and a second mating portion (e.g., second element 220) comprising a second plurality of electrically conductive conduits configured to engage and be in electrical communication with the first plurality of electrically conductive conduits. For example, the first mating portion can comprise a socket 310 of an electrical connector and the second mating portion can comprise a plug 320 of the electrical connector.

In an operational block 620, the method 600 further comprises pressing a first surface (e.g., having a first hardness) of the first mating portion against a second surface (e.g., having a second hardness greater than the first hardness) of the second mating portion, the first and second surfaces forming a first moisture barrier between the first and second mating portions. In an operational block 630, the method 600 further comprises pressing and bending an elastic protrusion of the second mating portion using a third surface (e.g., a substantially rigid surface) of the first mating portion, the elastic protrusion and the third surface forming a second moisture barrier between the first and second mating portions. For example, the first moisture barrier and the second moisture barrier can inhibit moisture ingress from an environment outside the first and second mating portions into an inner region bounded by the first and second mating portions.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It is to be appreciated that the implementations disclosed herein are not mutually exclusive and may be combined with one another in various arrangements. In addition, although the disclosed methods and apparatuses have largely been described in the context of conventional cochlear implants, various implementations described herein can be incorporated in a variety of other suitable devices, methods, and contexts. More generally, as can be appreciated, certain implementations described herein can be used in a variety of wearable device contexts that can utilize small electrical connectors comprising multiple portions that are configured to be repeatedly coupled to and decoupled from one another.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

While the methods and systems are discussed herein in terms of elements labeled by ordinal adjectives (e.g., first, second, etc.), the ordinal adjective are used merely as labels to distinguish one element from another (e.g., one signal from another or one circuit from one another), and the ordinal adjective is not used to denote an order of these elements or of their use.

The invention described and claimed herein is not to be limited in scope by the specific example implementations herein disclosed, since these implementations are intended as illustrations, and not limitations, of several aspects of the invention. Any equivalent implementations are intended to be within the scope of this invention. Indeed, various modifications of the invention in form and detail, in addition to those shown and described herein, will become apparent to those skilled in the art from the foregoing description. Such modifications are also intended to fall within the scope of the claims. The breadth and scope of the invention should not be limited by any of the example implementations disclosed herein, but should be defined only in accordance with the claims and their equivalents.

What is claimed is:

1. An apparatus comprising:

a first element and a second element configured to be repeatedly mechanically coupled to and decoupled from one another;

a first seal between the first element and the second element, the first seal configured to inhibit moisture ingress from an environment surrounding the first and second elements to a first region enclosed at least partially by the first seal; and a second seal between the first element and the second element, the second seal configured to inhibit moisture ingress from the first region to a second region enclosed at least partially by the second seal, one of the first and second seals comprising two first surfaces of the first and second elements in contact with one another, another one of the first and second seals comprising a second surface and a resiliently bendable protrusion of the first and second elements in contact with one another.

2. The apparatus of claim 1, wherein the first element comprises a socket comprising a first set of electrical connectors and the second element comprises a plug comprising a second set of electrical connectors, the first and second sets of electrical connectors at least partially within the second region and configured to be in electrical communication with one another.

3. The apparatus of claim 1, wherein the first seal comprises a snap seal comprising the two first surfaces of the first and second elements in contact with one another and the second seal comprises a lip seal comprising the second surface and the resiliently bendable protrusion of the first and second elements in contact with one another.

4. The apparatus of claim 3, wherein one of the two first surfaces comprises a thermoplastic elastomer or silicone material configured to be sufficiently soft such that the other one of the two first surfaces indents the thermoplastic elastomer or silicone material.

5. The apparatus of claim 1, wherein the resiliently bendable protrusion is configured to be bent by the second surface upon the second element being mechanically coupled to the first element.

6. The apparatus of claim 1, wherein the first element and the second element are configured to snap together and the two first surfaces are configured to contact and press against one another upon the first and second elements being snapped together.

7. The apparatus of claim 1, wherein the second element comprises an outer molding and the first element comprises an elongate portion configured to snap into the outer molding, the two first surfaces comprising an inner surface of the outer molding and an outer surface of the elongate portion.

8. The apparatus of claim 7, wherein the second element comprises the resiliently bendable protrusion and the second surface comprises an inner surface of the elongate portion.

9. The apparatus of claim 8, wherein the inner surface of the outer molding presses the elongate portion against the resiliently bendable protrusion such that forces applied to the elongate portion by the inner surface of the outer molding and by the protrusion are in substantially opposite and substantially colinear directions.

10. The apparatus of claim 1, wherein one of the two first surfaces has a first hardness and the other of the two first surfaces has a second hardness greater than the first hardness.

11. The apparatus of claim 1, wherein the first element comprises at least one first interlock portion and the second element comprises at least one second interlock portion configured to engage with and disengage from the at least one first interlock portion, the at least one first interlock portion and the at least one second interlock portion configured to inhibit relative rotation between the first element and the second element about a center axis extending through the first and second elements.

12. The apparatus of claim 1, wherein the apparatus is an external portion of an acoustic prosthesis system.

13. An apparatus comprising:

an elastic protrusion;

a first surface facing the elastic protrusion; and a first region between the elastic protrusion and the first surface, the first region configured to receive two oppositely facing second surfaces such that the first surface engages one of the two second surfaces to form a first moisture seal and the elastic protrusion engages and is bent by another of the two second surfaces to form a second moisture seal.

14. The apparatus of claim 13, wherein the apparatus is configured to be repeatedly mechanically coupled to and decoupled from the two second surfaces.

15. The apparatus of claim 13, wherein the elastic protrusion and the first surface are substantially circular and concentric with one another with the first region therebetween, and the two second surfaces are substantially circular and concentric with one another.

16. The apparatus of claim 13, wherein, upon the first region receiving the two second surfaces, the first moisture seal is configured to inhibit moisture ingress into the first region from an environment surrounding the apparatus and the second moisture seal is configured to inhibit moisture ingress into a second region from the first region.

17. The apparatus of claim 13, further comprising a first set of electrically conductive conduits configured to, upon the first region receiving the two second surfaces, mate with a second set of electrically conductive conduits, the mated first and second sets of electrically conductive conduits within the second region.

18. The apparatus of claim 13, wherein the first moisture seal and the second moisture seal are each substantially circular.

19. The apparatus of claim 18, further comprising a beveled surface and a recess configured to form a snap fit with a protrusion comprising the two second surfaces, the protrusion having a substantially D-shaped cross-section in a plane substantially perpendicular to the first and second moisture seals.

20. A method comprising:

providing a first mating portion comprising a first plurality of electrical conduits and a second mating portion comprising a second plurality of electrical conduits configured to engage and be in electrical communication with the first plurality of electrical conduits;

pressing a first surface of the first mating portion against a second surface of the second mating portion, the first and second surfaces forming a first moisture barrier between the first and second mating portions; and pressing and bending an elastic protrusion of the second mating portion using a third surface of the first mating portion, the elastic protrusion and the third surface forming a second moisture barrier between the first and second mating portions.

21. The method of claim 20, wherein the first mating portion comprises a socket of an electrical connector and the second mating portion comprises a plug of the electrical connector.

22. The method of claim 20, wherein the first moisture barrier and the second moisture barrier inhibit moisture ingress from an environment outside the first and second mating portions into an inner region bounded by the first and second mating portions.

* * * * *